United States Patent [19]

Dynes et al.

[11] Patent Number: 5,165,977
[45] Date of Patent: Nov. 24, 1992

[54] LONG SHELF LIFE BISMALEIMIDE STRUCTURAL ADHESIVE

[75] Inventors: Paul J. Dynes, Los Angeles; Laura A. Hunter, Gardena, both of Calif.

[73] Assignee: Northrop Corporation, Los Angeles, Calif.

[21] Appl. No.: 561,746

[22] Filed: Aug. 2, 1990

[51] Int. Cl.$^5$ .............................................. A61F 13/02
[52] U.S. Cl. ....................................... 428/40; 428/255;
428/352; 428/355; 526/262; 528/322; 548/521
[58] Field of Search ........................ 428/40, 255, 352;
526/262; 528/322; 548/521

[56] References Cited

U.S. PATENT DOCUMENTS

| | | | |
|---|---|---|---|
| 3,455,045 | 7/1969 | Thomas | 428/913.3 |
| 4,689,378 | 8/1987 | Chaudhari | 528/322 |
| 4,691,025 | 9/1987 | Domeier | 548/521 |
| 4,707,391 | 11/1987 | Hoffman | 428/40 |
| 4,714,726 | 12/1987 | Ketley | 524/111 |
| 4,721,639 | 1/1988 | Shimp | 428/40 |
| 4,743,647 | 5/1988 | Domeier | 528/322 |
| 4,789,704 | 12/1988 | Stenzenberger | 528/322 |
| 4,847,154 | 7/1989 | Ryang | 428/415 |
| 4,876,153 | 10/1989 | Thorfinnson | 428/352 |
| 4,943,472 | 7/1990 | Dyksterhouse | 428/273 |
| 4,968,545 | 11/1990 | Fellman | 428/36.1 |
| 4,981,934 | 1/1991 | Stenzenberger | 528/322 |
| 4,994,316 | 2/1991 | Browne | 428/209 |
| 5,003,018 | 3/1991 | Repecka | 528/322 |

OTHER PUBLICATIONS

Stenzenberger, "Toughened bismaleimides: Concepts, achievement directions", 19th International SAMPE Tech. Conf., Oct. 13-15, 1987.
Shaw, "Toughened bismaleimide adhesives", Int. J. Adhesion and Adhesives, Jul. 1985, pp. 123-126.
Chaudhari, "Characterization of bismaleimide system, XU-292", SAMPE Journal, Jul./Aug. 1985, pp. 17-21.

Primary Examiner—Ellis P. Robinson
Assistant Examiner—Nasser Ahmad
Attorney, Agent, or Firm—Terry J. Anderson; Robert B. Block

[57] ABSTRACT

An adhesive patch for a composite structure, an adhesive for that patch and a method for forming the adhesive patch for the composite structure are described. The adhesive includes three uncured components of a bismaleimide polymeric mixture. Two of these components are liquid. The liquids include a liquid vinyl-terminated rubber monomer and a liquid bis(alkenylaromatic)aryl or bis(alkenylaromatic)alkyl monomer. The further component is a solid bismaleimide monomer that is intimately mixed and suspended in the liquid bis(alkenylaromatic)aryl or bis(alkenylaromatic)alkyl monomer and liquid vinyl-terminated rubber.

28 Claims, 1 Drawing Sheet

LONG SHELF LIFE BISMALEIMIDE STRUCTURAL ADHESIVE

BACKGROUND OF INVENTION

This invention is directed to an adhesive patch for repair of composite structures, an adhesive for that patch and to a method of forming the adhesive patch. Further, the invention is directed to a method of repairing a damaged composite structure. The adhesive for the adhesive patch is based upon "toughened" bismaleimide chemistry.

Composites are increasingly being used for structural components in aircraft. In a manner similar to their metallic counterparts, composite structural components for aircraft can sustain damage. When so damaged it is necessary to repair the composite structure. In repairing a composite structure an adhesive is utilized to join a sheet of a "prepreg" over the damaged area of the composite structure. "Prepregs" are sheets of uncured resin impregnated into composite structural fibers. Depending on the properties of the uncured resin, a binder may or may not be necessary to hold the prepreg together prior to curing. In order for the prepreg to adhere to the composite structure, an adhesive must be interspaced between the composite structure and the prepreg. After adhering the prepreg to the composite structure, it can then be cured to integrate it with the composite structure.

Composites based upon bismaleimide chemistry have certain inherent advantages over other composite systems such as epoxy composites. These include high elastic modulus, high glass transition temperatures and improved fracture toughness, i.e. impact resistance. This makes such bismaleimide composites particularly useful for aircraft structures.

Bismaleimide resins are generally synthesized from aromatic diamines and maleic acid anhydride. The reaction between the diamine and the maleic acid anhydride, however, liberates certain volatiles. Because of the liberation of these volatiles, if aromatic diamines and maleic acid anhydride are utilized as an adhesive, they can give rise to voids along the bond line during the repair of a composite structure. Such voids obviously impair the integrity of the repaired structure rendering this repair highly undesirable. In order to avoid the production of volatiles, low molecular weight imide prepolymers that already contain an imide functionality can be utilized. Bismaleimide structures contain two such imide functionalities joined by a bivalent linking group, as for instance an aromatic or aliphatic linking group. When used alone, however, such bismaleimide structures tend to be extremely brittle and subject to fracture.

In order to improve the properties of bismaleimides it has been suggested by Shaw, et al., *J. Adhesion and Adhesives*, 123, July 1985, to "toughen" bismaleimides with carboxyl-terminated butadiene-acrylonitrile. In an extension of Shaw's work, Stenzenberger, et al., *19th International SAMPE Technical Conference*, Oct. 13 through 15, 1987, suggested that a bismaleimide/bispropenylphenoxy resin system could be modified to toughen the resin by the addition of the carboxy terminated butadiene-acrylonitrile rubbers of Shaw et al. In forming such a modified resin, these authors melt blended the bismaleimide resin with the rubber component followed by curing.

Chaudhari, et al., *SAMPE Journal*, July/August 1985, describes a bismaleimide resin system known as XU292. XU292 is commercially available from the Ciba-Geigy Corporation. Its components are 4,4'-bismaleimidodiphenylmethane and o,o'-diallylbisphenol A, i.e. 2,2'-bis(3,3'-diallyl-4,4'-phenoxy)propane. As is shown by Chaudhari, et al., a blend of these two monomers undergoes a prepolymerization at 110° C. to 125° C. At this temperature Chaudhari, et al. found that a clear homogenous melt was formed that underwent a prepolymerization reaction of an "ene" type.

While we do not wish to be bound by theory, it is believed that the system of Shaw et al. or Stenzenberger et al. in forming a melt, would undergo the same prepolymerization as discussed by Chaudhari, et al. Chaudhari, et al further discloses. that the 4,4'-bismaleimidodiphenylmethane and o,o'-diallylbisphenol A resin system undergoes a second reaction at a higher temperature at about 250° C. wherein polymerization between the two monomers is complete.

In U.S. Pat. No. 4,471,728 to Katley a low temperature single component polyamide adhesive is discussed. The shelf life of this adhesive is indicated to be six months at 0° C., 3 weeks at 25° C., but only, as a maximum, 5 days at 40° C. 40° C. is typical of storage or shipping temperatures that would occur in transport and use of such an adhesive. The storage properties of the Katley adhesive are fairly indicative of storage properties of all single system or single component composite adhesives. That is, unless these adhesives are stored at or below 0. they have a very poor shelf life. The only known way to solve this storage problem is to use a two component adhesive and to mix the two components of the adhesive immediately prior to use. Such two component adhesives, however, are very difficult to use in a "field" type setting since for optimum performance the exact quantities of the two components of the adhesive must be accurately weighed out prior to mixing. Further, after mixing, such adhesives must be applied to a scrim cloth in a thin uniform layer. The scrim cloth bearing the adhesive is then applied to the composite structure in need of repair. All of this is difficult if not impossible to do at a field operation level.

BRIEF DESCRIPTION OF THE INVENTION

This invention is directed to an adhesive patch that is easily and conveniently used at a field level operation, an adhesive for that patch and methods of making and using the patch that result in a one part adhesive having long term stability at room temperature. This invention provides an adhesive patch for a composite structure that includes a scrim cloth and a layer of adhesive on the scrim cloth wherein the adhesive includes three uncured monomer components including a liquid vinyl-terminated rubber monomer, a liquid bis(alkenylaromatic)aryl or bis(alkenylaromatic)alkyl monomer and a solid bismaleimide monomer. The vinyl-terminated rubber monomer and the liquid bis(alkenylaromatic)aryl or bis(alkenylaromatic)alkyl monomer are both liquids. The solid bismaleimide monomer is intimately suspended in and mixed in these liquids. Further, the adhesive patch can include a release coating on the layer of the adhesive, as for instance a removable protective layer of polytetrafluoroethylene. Additionally, for flow characteristics, a thixotropic agent can be included in the layer of the adhesive.

In a preferred embodiment of the adhesive patch of the invention, the liquid vinyl-terminated rubber monomer is present in an amount of from about 5 parts to about 20 parts per 100 parts of the solid bismaleimide monomer, the liquid bis(alkenylaromatic)aryl or bis(alkenylaromatic)alkyl monomer is present in an amount of from about 65 parts to about 75 parts per 100 parts of the solid bismaleimide monomer and the thixotropic agent is present in an amount of from about 2 parts to about 10 parts per 100 parts of the solid bismaleimide monomer.

In a preferred embodiment of the adhesive patch of the invention, the liquid vinyl-terminated rubber monomer comprises a liquid vinyl-terminated butadiene-acrylonitrile rubber, the liquid bis(alkenylaromatic)aryl or bis(alkenylaromatic)alkyl monomer comprises monomers selected from the group consisting of bis(alkenylaryl)alkyl, bis(alkenylaryloxy)alkyl, bis(alkenylaryl)aryl and bis(alkenylaryloxy)aryl. Preferably the alkenylaryl group is vinylphenyl or allylphenyl and alkenylaryloxy group is vinylphenoxy or allylphenoxy. A preferred bis(alkenylaromatic)aryl or bis(alkenylaromatic)alkyl monomer is 2,2-bis(3,3'-diallyl-4,4'-phenoxy)propane. A preferred solid bismaleimide monomer is 4,4'-bismaleimidodiphenylmethane. As such all three of the preferred components of the adhesive include carbon-carbon double bonds, i.e. alkene bonds.

In a method of the invention for forming an adhesive patch, a liquid vinyl-terminated rubber monomer and a liquid bis(alkenylaromatic)aryl or bis(alkenylaromatic)alkyl monomer are mixed together in a vessel to form a liquid mixture. After forming this liquid mixture, a solid bismaleimide monomer is mixed into it. The mixture of the solid bismaleimide monomer and the liquid mixture is then added to a scrim cloth and spread on the scrim cloth into a thin film on the scrim cloth.

Preferably the solid bismaleimide is mixed into the liquid mixture utilizing milling. Preferably the mixture of the solid bismaleimide monomer in the liquid mixture is spread into the thin film on the scrim cloth by calendering.

In a preferred embodiment of the invention the liquid vinyl-terminated rubber monomer and the liquid bis(alkenylaromatic)aryl or bis(alkenylaromatic)alkyl monomer are mixed and heated at 120° C. to form a liquid mixture. This liquid mixture is then cooled to room temperature prior to the addition of the bismaleimide monomer to the liquid mixture. By cooling the liquid mixture prior to the addition of the bismaleimide monomer the above referred to prepolymerization reaction of Chaudhari et. al. is prevented between the bismaleimide monomer and the ethylene groups of the other two monomers.

BRIEF DESCRIPTION OF THE DRAWINGS

This invention will be better understood when taken in conjunction with the figures and the remainder of this specification wherein.

DETAILED DESCRIPTION OF THE INVENTION

Figure 1:
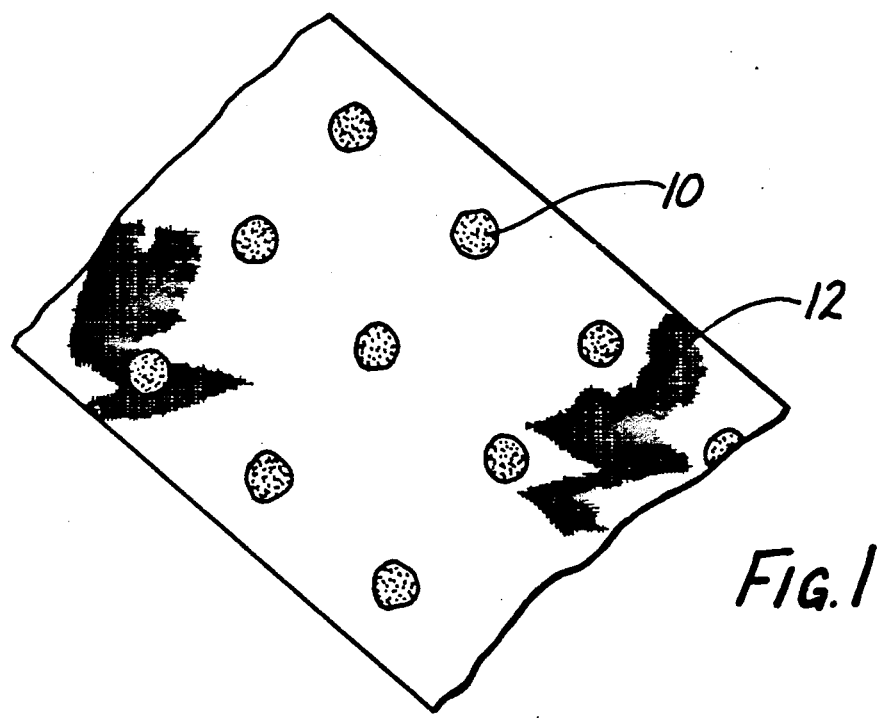
FIG. 1 is an isometric view of a woven scrim cloth having aliquots of adhesive of the invention positioned thereon prior to spreading of the adhesive.

This invention includes an adhesive and an adhesive patch made from this adhesive wherein the adhesive is a one component adhesive and has extremely long shelf life at room temperature. Shelf lives in excess of one year at room temperature have been measured with the adhesive of the invention. Even after one years time, an adhesive patch of the invention retained good "tack" and "drape" characteristics. Thus, even upwards to one year an adhesive patch of the invention remained sticky and could be conformed to the surface of a composite structure in need of repair.

The above is opposed to known one part or single component bismaleimide film adhesives that, after periods as short as days, sometimes even hours, undergo reaction and lose both their tack and drape. This renders these known one part film adhesives useless with respect to utility as adhesives. Because of the long shelf life of the adhesive and adhesive patch of the invention, the adhesive patch of the invention is extremely useful for repair of bismaleimide composite aircraft structures. Since no refrigeration is necessary for storage of the adhesive patch of the invention, this simplifies the processing and transport of the same allowing for field level repairs of composite aircraft structure and other composite structures.

The adhesive of the invention is a three component adhesive. Two of these components are liquid and the third component is a solid that is suspended in the liquids. The solid component is a bismaleimide resin monomer. It is mixed into the liquid components at or below temperatures wherein it might react with the liquid components to form either polymers or prepolymers depending upon the chemistry. The solid is present in an amount compared to the liquid components such that the mixture of the solid in the liquid component comprises a "very sticky goo" of the consistency of about peanut butter.

The solid bismaleimide monomer can be any one of various bismaleimide resin monomers that are capable of undergoing polymerization reactions. It is comprised of two maleimide moieties that are joined by an appropriate divalent linking group. Such compounds are of the structure:

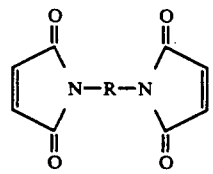

wherein R is a divalent linking group.

The above referred to U.S. Pat. No. 4,714,726 to Katley lists a series of appropriate divalent linking groups that can be linked to the maleimide moiety at either end of the divalent linking groups. For this reason the entire contents of U.S. Pat. No. 4,714,726 are herein incorporated by reference.

A particularly preferred bismaleimide monomer would be a monomer wherein the divalent linking group is a diphenylmethane group. The precursors of this bismaleimide monomer are readily available and as such this monomer is available from various manufacturers at economical prices. One such manufacturer is Ciba-Geigy. Ciba-Geigy's 4,4'-bismaleimidodiphenylmethane is sold under the tradename of Matrimid 5292A.

Other suitable divalent linking groups for the bismaleimide monomer would include toluene substituted at its 2 and 4 positions with the maleimide moieties or a 2,2,3-trimethyl heptane substituted at the 1 and 5 positions the maleimide moiety. Other bismaleimides might be as is described by Domeier, et al. in U.S. Pat. No. 4,691,025, the entire contents of which are also herein incorporated by reference.

Of the various bismaleimide monomers available for use in the invention, these bismaleimide monomers must be in a solid form at room temperature such that they can be mixed and suspended in the liquid components of the adhesive and remain in the solid state and therefore non-reactive at room temperature.

The liquid form of the adhesive of the invention has two components, one of these being a vinyl-terminated rubber monomer and the other being a further monomer that also includes an alkenyl moiety suitable for polymerization with the imide moiety of the bismaleimide monomer. Both of these are required to be liquid such that they will mix with and suspend the solid bismaleimide monomer in the adhesive.

The alkenyl moiety can reside on bis(alkenylaromatic)aryl compounds or bis(alkenylaromatic)alkyl compounds. A particularly useful compound is o,o'-diallylbisphenol A, i.e. 2,2-bis(3,3'-diallyl-4,4'-phenoxy)propane. Other such compounds might include 4,4'-diphenyl methane, 4,4'-diphenylsulfone, 4,4'-biphenol, 4,4'-biphenol sulfide, 4,4'-dihydroxydiphenyl methane, 4,4'-dihydroxydiphenyl sulfone, 4,4'-biphenol, 4,4'-dihydroxydiphenyl sulfide, 4,2'-biphenol, or even tris(4-hydroxyphenyl)methane, each appropriately substituted with an alkenyl moiety on the phenyl or phenoxy moiety.

Each of the above compounds includes a bis(alkenylaromatic)aryl or bis(alkenylaromatic)alkyl monomer. More particularly they include bis(alkenylaryl)alkyl, bis(alkenylaryloxy)alkyl, bis(alkenylaryl)aryl or bis(alkenylaryloxy)aryl groups. Particularly preferred would be vinylphenyl or allylphenol for alkenylallyl groups and vinylphenoxy or allylphenoxy for alkenylaryloxy groups. The present preferred compound of choice is 2,2-bis(3,3'-diallyl-4,4'-phenoxy)propane. This compound is available from Ciba-Geigy under the tradename of Matrimid 5292B.

4,4'-bismaleimidodiphenylmethane by itself is extremely brittle. Adding o,o'-diallylbisphenol A, i.e. 2,2'bis(3,3'-diallyl-4,4'-phenoxy)propane yields neither an adhesive nor a suitably toughened bismaleimide resin. Copolymerization of 4,4'-bismaleimidodiphenylmethane and o,o'-diallylbisphenol A yields a resin having extremely useful properties, however adhesiveness is not among the salient properties of the 4,4'-bismaleimidodiphenylmethane/o,o'-diallylbisphenol A resin system.

The addition of a further vinyl-terminated monomer, in this case a vinyl-terminated rubber monomer, to the mixture of the bismaleimide monomer and the bis(alkenylaromatic)aryl or bis(alkenylaromatic)alkyl monomer yields an adhesive mixture. We have found by utilizing a vinyl-terminated rubber monomer advantageous properties are obtained, as for instance, in comparison to other terminated rubbers such as amine or carboxyl terminated rubbers. With a vinyl-terminated rubber monomer, not only is the resulting resin toughened, but the mixture of components prior to polymerization has good adhesive properties maintaining both tack and drape for long periods of time at room temperature. Presently we have tested these properties over time periods spanning greater than a year and have found that adhesive patches and adhesives made as per the teachings of this invention retain their tack and drape over these extended time periods even when stored at room temperature.

Suitable vinyl terminated rubber monomers include vinyl-terminated butadiene-acrylonitrile rubbers. One such vinyl-terminated rubber is sold by B. F. Goodrich under the trade designation of HYCAR Reactive Liquid Polymer 1300X22. A further such vinyl-terminated rubber is also sold by B. F. Goodrich under the trade designation of HYCAR Reactive Liquid Polymer 1300X33. HYCAR Reactive Liquid Polymer 1300X22 has a formula as follows:

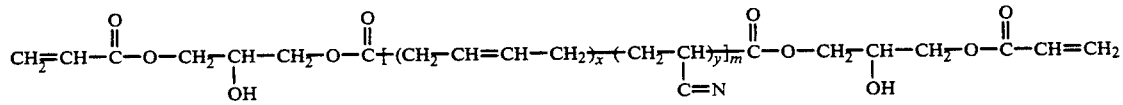

As indicated by the supplier, B. F. Goodrich, M is approximately 10, Y is 1 and X is 6.25. The 1300X33 compound differs from the 1300X22 compound at its terminal ends. Whereas the 1300X22 compound has acrylate functionalities, i.e. $CH_2=CH-$, at these terminal ends, the 1300X33 compound has methacrylate functionalities, i.e. $CH_3CH=CH-$.

For enhanced adhesive properties, a further component can be added to the adhesive. This component is a thixotropic agent, as for instance fumed silica. Suitable for use would be the fumed silica. Cab-O-Sil M5 from Cabot Corporation. In repairing a composite structure, use of the thixotropic agent serves to help maintain the adhesive over the bond line during polymerization of the adhesive. The presence of the thixotropic agent maintains the viscosity of the adhesive during heating and thus prevents thinning or reduction of viscosity of the adhesive just prior to polymerization.

The vinyl-terminated rubber monomer and the bis(alkenylaromatic)aryl or bis(alkenylaromatic)alkyl monomer are chosen as liquids such that they can be conveniently mixed together and used to suspend the solid bismaleimide monomer therein. Typically the bismaleimide monomer would be of a particle size of about 10 microns and would be added to the liquid components at a temperature below that wherein it would react with the liquid components. Preferably this is simply done at room temperature. If desired, in mixing the liquid components (prior to the addition of the solid component therein) the liquid components could be heated to facilitate their mixing, however, they are cooled back down to a temperature below that wherein the solid bismaleimide polymer will react with them prior to mixing the solid bismaleimide monomer into them.

The solid bismaleimide monomer suspended in the liquid components is only heated during the cure cycle when the adhesive patch of the invention is actually used and is not heated prior to such cure cycle. This is contrasted to the prior art wherein in mixing 4,4'-bismaleimidodiphenylmethane and o,o'-diallylbisphenol A, these components were mixed as a "melt" at elevated temperature, as for instance 130° C. By using such a melt to mix the solid bismaleimide monomer into the liquid components this also concurrently dissolved the solid into the liquid. Contrary to using melting as the method of mixing, in this invention in mixing the components of the invention together only mechanical mixing is utilized to distribute the solid bismaleimide monomer throughout the liquid mixture. Further this mechanical mixing is not done in a "melt" nor at any other elevated temperature that might result in dissolving of the solid into the liquid.

For production quantities, mixing of the solid bismaleimide into the liquid components is preferably done by milling. Such milling is effected by passing the components through rotating rolls and the like. For small batches of the adhesive of the invention, hand mixing, as for instance by kneading the components located in a sealed bag, can be practiced.

For preparing adhesives of the invention, for each 100 parts by weight of the bismaleimide monomer, from about 65 to about 55 parts by weight of the bis(alkenylaromatic)aryl or bis(alkenylaromatic)alkyl monomer will be utilized with the preferred range being about 68 parts by weight. For each 100 parts by weight of the bismaleimide monomer, from about 5 to about 20 parts per weight the vinyl-terminated rubber monomer will be utilized with preferred amount of about 17 parts per weight. If used, for each 100 parts by weight of the bismaleimide monomer, preferably the thixotropic agent would be present at an amount of about 2 to about 10 parts per weight.

After forming a liquid mixture of the liquid vinyl-terminated rubber monomer and the liquid bis(alkenylaromatic)aryl or bis(alkenylaromatic)alkyl monomer, the solid bismaleimide is intimately mixed and suspended therein. The resulting product generally has a consistently of peanut butter and is very sticky and tacky. A layer of this product is then applied to a scrim cloth, preferably a glass scrim cloth and spread on the surface of the scrim cloth until a thin film remains on the scrim cloth. A convenient method of doing this is illustrated in the figures.

In FIG. 1, aliquots 10 of the adhesive of the invention have been systematically located over the surface of scrim cloth 12. A teflon (polytetrafluoroethylene) film 14 is positioned over the top of the adhesive aliquots 10. A like teflon film 16 is positioned underneath the scrim cloth 12. This sandwich is then placed between platens 18 and 20 and positioned in a press. Pressure is applied at from about 200 psi to about 2300 psi to spread the adhesive aliquots 10 in a thin film over the surface of the scrim cloth 12. This "calendering" of the thick, sticky adhesive aliquots 10 over the surface of the scrim cloth 12 serves to leave the adhesive in a uniform thin layer, as for instance a 10 to 15 mil thick layer on top of the scrim cloth.

Suitable for use as a scrim cloth would be a 0.0105 pound per square foot glass scrim cloth available from Clark-Schwebel, Long Beach, California. Typical would be Clark-Schwebel 108 glass fabric that is compatible for use with this bismaleimide resin system.

The adhesive is spread over the scrim cloth such that it will be present in an amount of from about 0.03 pounds per square foot of the patch to about 0.1 pounds per square foot of the patch. At an adhesive weight of 0.1 pounds per square foot, the scrim cloth comprises about 10% of the weight of the film adhesive. With this same cloth, at lower pounds per square foot of the adhesive, of course the percentage weight of the glass carrier within the patch is increased.

Utilizing the above amounts of adhesive, either expressed as per the thickness of the adhesive or as per the weight of the adhesive per square foot of the patch, a final thickness of about 5 to 10 mils will be achieved after polymerization of the adhesive during use of the adhesive in patching a composite structure.

Figure 2:
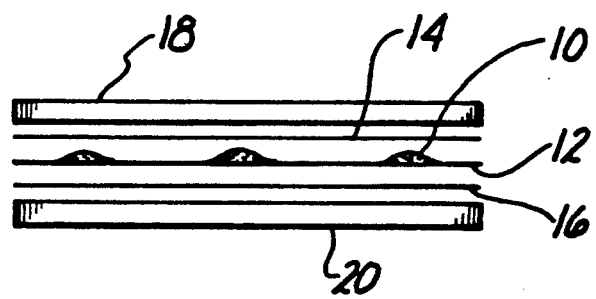
FIG. 2 is an elevational view showing the press set up for spreading of the adhesive of FIG. 1 on the scrim cloth of FIG. 1.

In removing the adhesive patch from the platens 18 and 20 of FIG. 2 after spreading of the adhesive as a thin film on the surface of the scrim cloth 12, the teflon layer 14, i.e. a PTFE layer, is retained over the thin film of the adhesive. This teflon layer protects the adhesive during storage. Prior to use of the adhesive patch, this layer would be peeled off exposing the fresh surface of the adhesive on the adhesive patch.

In use, an adhesive patch of the invention is applied to a damaged area of a composite structure. A bismaleimide prepreg layer is overlaid over the adhesive and both of these are vacuum bagged to the surface of the composite structure. The vacuum bagged composite structure having the prepreg and adhesive patch attached thereto are then heated for two hours at about 200° F. This is followed by heating for an additional two hours at about 350° F. The vacuum bag can then be removed and a post cure effected by heating for about four hours at about 450° F.

EXAMPLE I

Preparation Of Adhesive:

136 grams of o,o'-diallylbisphenol A (Ciba-Geigy Matrimid 5292B) were mixed with 33.6 grams of vinyl-terminated butadiene-acrylonitrile rubber (B.F. Goodrich Hycar 1300X22) in a resin kettle utilizing a mechanical mixer. The mixture was heated to 120° C. and degassed under vacuum (30 inches of mercury) until bubbling ceases. This occurred in about 15 minutes. 11.1 grams of Cab-O-Sil M-5 (Cabot Corporation) was added with stirring. The mixture was then cooled to room temperature. At room temperature 200 grams of 4,4'-bismaleimidodiphenylmethane (Ciba-Geigy Matrimid 5292A) was added to the mixture. The material was put into a zip lock bag and kneaded until the solid was completely dispersed into the liquid components. After mixing of the solid bismaleimide resin into the liquid mixture, the mixture had a color of brown mustard and had a texture similar to peanut butter. It was very tacky and very viscous.

EXAMPLE II

Preparation Of Adhesive Patch:

28.5 grams of the adhesive of Example I was broken up and positioned as "globs" onto a 12 inch by 18 inch two ply Clark-Schwebel 108 glass fabric. A comparable size PTFE release film was positioned both below and above the scrim cloth containing the adhesive globs and the totality of this sandwich was positioned between two ½ inch aluminum plates, one on top, one on bottom. This sandwich was then positioned into a press and subjected to 2250 psi for approximately 15 minutes at room temperature. This caused the adhesive globs to flow out and form a thin uniform film on the surface of the glass scrim cloth.

EXAMPLE III

Long Term Stability of Adhesive Patches:

Adhesive patches were prepared as per Example II above. These patches were stored at room temperature and systematically over a period of 54 weeks tested as to their tack and drape and their adhesive properties.

Good tack and drape was maintained throughout the test period including the 54 week test adhesive patch. Upon heating and processing through an appropriate cure cycle, the adhesive patch polymerized in the expected manner.

While, for illustrative purposes, this invention has been described with reference to its preferred embodiments, other embodiments, variations and/or modifications might be evident to the art skilled given this disclosure. As such, limitation of this invention is not to the preferred embodiments, but is as is set forth in the following claims.

We claim:

1. An adhesive patch for a composite structure having a shelf life in excess of one year at room temperature comprising:
   a scrim cloth;
   a layer of an adhesive spread on said scrim cloth, said adhesive comprising an essentially unreacted, premixed three component bismaleimide polymeric mixture including a liquid vinyl-terminated rubber monomer, a liquid bis(alkenylaromatic) aryl or bis(alkenylaromatic) alkyl and a solid bismaleimide monomer;
   wherein said liquid monomers are premixed at an elevated temperature to facilitate mixing and then cooled, and
   and further wherein said solid bismaleimide monomer is intimately mixed into and suspended in said liquid bis(alkenylaromatic)aryl or bis(alkenylaromatic) alkyl and said liquid vinyl-terminated rubber monomers at a temperature below that wherein said bismaleimide monomer would react with said premixed liquid monomers.

2. An adhesive patch of claim 1 further including:
   a release coating on said layer of adhesive.

3. An adhesive patch of claim 2 wherein:
   said release coating comprises a removable protective layer of polytetrafluoroethylene.

4. An adhesive patch of claim 1 wherein:
   said layer of adhesive is present in said patch in a weight of from about 0.03 pounds per square foot of said patch to about 0.1 pounds per square foot of said patch.

5. An adhesive patch of claim 1 wherein:
   said layer of adhesive is present in said patch in a thickness of from about 10 mils to about 15 mils; and
   said scrim cloth is a woven glass cloth.

6. An adhesive patch of claim 1 further including:
   a thixotropic agent in said layer of adhesive.

7. An adhesive patch of claim 6 wherein:
   said thixotropic agent is fumed silica.

8. An adhesive patch of claim 1 wherein:
   said liquid vinyl-terminated rubber monomer is present in an amount of from about 5 parts to about 20 parts per 100 parts of said solid bismaleimide monomer; and
   said liquid bis(alkenylaromatic) aryl or bis(alkenylaromatic)alkyl monomer is present in an amount of from about 65 parts to about 75 parts per 100 parts of said solid bismaleimide monomer.

9. An adhesive patch of claim 8 including:
   a thixotropic agent in said layer of adhesive; and
   wherein said thixotropic agent is present in an amount of from about 2 parts to about 10 parts per 100 parts of said solid bismaleimide monomer.

10. An adhesive patch of claim 1 wherein:
    said liquid vinyl-terminated rubber monomer comprises a liquid vinyl-terminated butadiene-acrylonitrile rubber.

11. An adhesive patch of claim 1 wherein:
    said liquid bis(alkenylaromatic)aryl or bis(alkenylaromatic)alkyl monomer comprises a monomer selected from the group consisting of bis(alkenylaryl)alkyl, bis(alkenylaryloxy)alkyl, bis(alkenylaryl)aryl and bis(alkenylaryloxy)aryl.

12. An adhesive patch of claim 11 wherein:
    alkenylaryl group is vinylphenyl or allylphenyl; and alkenylaryloxy group is vinylphenoxy or allylphenoxy.

13. An adhesive patch of claim 11 wherein:
    said liquid bis(alkenylaromatic)aryl or bis(alkenylaromatic)alkyl monomer is 2,2-bis(3;3'-diallyl-4,4'-phenoxy)propane.

14. An adhesive patch of claim 1 wherein:
    said solid bismaleimide monomer is a compound of the formula:

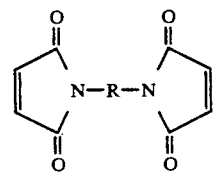

wherein R is a divalent linking group.

15. An adhesive patch of claim 1 wherein:
    said solid bismaleimide monomer is 4,4'-bismaleimidodiphenylmethane.

16. An adhesive patch as in claim 1 wherein said rubber monomer is
    liquid vinyl-terminated butadiene-acrylonitrile rubber; said bis(alkenylaromatic)aryl or bis(alkenylaromatic)alkyl liquid monomer is liquid 2,2-bis(3,3'-diallyl-4,4'-phenoxy)propane; and said solid monomer is 4,4'-bismaleimido-diphenylmethane.

17. A bismaleimide based adhesive having room temperature stability in excess of one year at room temperature comprising:
    an uncured liquid vinyl-terminated rubber monomer;
    an uncured liquid bis(alkenylaromatic)aryl or bis(alkenylaromatic)alkyl monomer; wherein said liquid monomers are premixed at an elevated temperature to facilitate mixing and thereafter cooled to room temperature to which is added;
    a finely divided uncured solid bismaleimide monomer;
    said solid bismaleimide monomer being intimately mixed and suspended in said liquid bis(alkenylaromatic) aryl or bis(alkenylaromatic)alkyl and liquid vinyl-terminated rubber monomer mixture at a temperature below that wherein said bismaleimide monomer would react with said premixed liquid monomers.

18. An adhesive of claim 17 further including:
    a thixotropic agent.

19. An adhesive of claim 17 wherein:
    said liquid vinyl-terminated rubber monomer is present in an amount of from about 5 parts to about 20 parts per 100 parts of said solid bismaleimide monomer; and
    said liquid bis(alkenylaromatic)aryl or bis(alkenylaromatic)alkyl monomer is present in an amount of from about 65 parts to about 75 parts per 100 parts of said solid bismaleimide monomer.

20. An adhesive of claim 19 including:

a thixotropic agent in said layer of adhesive; and wherein said thixotropic agent is present in an amount of from about 2 parts to about 10 parts per 100 parts of said solid bismaleimide monomer.

21. An adhesive of claim 17 wherein:

said liquid vinyl-terminated rubber monomer comprises a liquid vinyl-terminated butadiene-acrylonitrile rubber.

22. An adhesive of claim 17 wherein:

said liquid bis(alkenylaromatic)aryl or bis(alkenylaromatic)alkyl monomer comprises a monomer selected from the group consisting of bis(alkenylaryl)alkyl, bis(alkenylaryloxy)alkyl, bis(alkenylaryl)aryl and bis(alkenylaryloxy)aryl.

23. An adhesive of claim 22 wherein:

alkenylaryl group is vinylphenyl or allylphenyl; and alkenylaryloxy group is vinylphenoxy or allylphenoxy.

24. An adhesive of claim 22 wherein:

said liquid bis(alkenylaromatic)aryl or bis(alkenylaromatic)alkyl monomer is 2,2-bis(3,3'-diallyl-4,4'-phenoxy)propane.

25. An adhesive of claim 17 wherein:

said solid bismaleimide monomer is a compound of the formula:

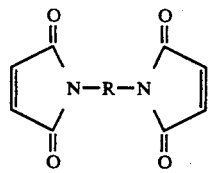

wherein R is a divalent linking group.

26. An adhesive of claim 17 wherein:

said solid bismaleimide monomer is 4,4'-bismaleimidodiphenylmethane.

27. A room temperature stable bismaleimide based adhesive comprising:

uncured liquid vinyl-terminated butadiene-acrylonitrile rubber;

uncured liquid 2,2-bis(3,3'-diallyl-4,4'-phenoxy)propane; uncured solid 4,4'-bismaleimido-diphenylmethane; and said 4,4'-bismaleimido-diphenylmethane being intimately mixed and suspended in said vinyl-terminated butadiene-acrylonitrile rubber and 2,2-bis(3,3'-diallyl-4,4'-phenoxy)propane.

28. An adhesive patch for a composite structure comprising:

a mixture of a liquid vinyl-terminated rubber monomer and a liquid bis(alkenylaromatic)aryl or bis(alkenylaromatic) alkyl monomer, said monomers being premixed together at an elevated temperature to facilitate mixing and then cooled to ambient temperature, into which a solid bimaleimide monomer is intimately mixed and suspended at a temperature below that wherein said bismaleimide monomer would react with said premixed liquid monomers; and a scrim cloth;

said mixture of said solid bismaleimide monomer in said liquid mixture of said liquid monomers being spread into a thin film on said scrim cloth.

* * * * *